A. S. LYMAN.
Apparatus for Purifying, Drying, and Cooling or Warming Air.

No. 168,654.

Patented Oct. 11, 1875.

Witnesses.

Inventor:
Azel. S. Lyman.

UNITED STATES PATENT OFFICE.

AZEL S. LYMAN, OF NEW YORK, N. Y.

IMPROVEMENT IN APPARATUS FOR PURIFYING, DRYING, AND COOLING OR WARMING AIR.

Specification forming part of Letters Patent No. 168,654, dated October 11, 1875; application filed April 25, 1873.

*To all whom it may concern:*

Be it known that I, A. S. LYMAN, of the city, county, and State of New York, have invented certain Improvements in Apparatus for Purifying, Cooling, and Drying or Warming and Moistening Air, and for other purposes, of which the following is a specification:

The first and principal object of my invention is the construction of an apparatus which shall not only take out all the impurities from the air while passing through it, but itself be kept sweet and pure, so that I can by its aid cheaply furnish dwellings and public buildings with an abundant supply of pure air, even though they be located in regions where the air is exceedingly impure.

My second object is to cool and dry the air when too warm and moist, and warm and moisten it when too cold and dry, and thus provide for healthy and comfortable ventilation at all seasons of the year; third, to exclude mosquitoes, filthy house-flies, &c.

My invention consists in a filter sprinkled with water, up through which air is passed for the supply of a room to be purified and cooled or warmed, and in a combination of such a filter so operated with an air-forcing apparatus, and its combination with the air-chamber of a heating apparatus, as hereinafter described and claimed.

Figure 1:
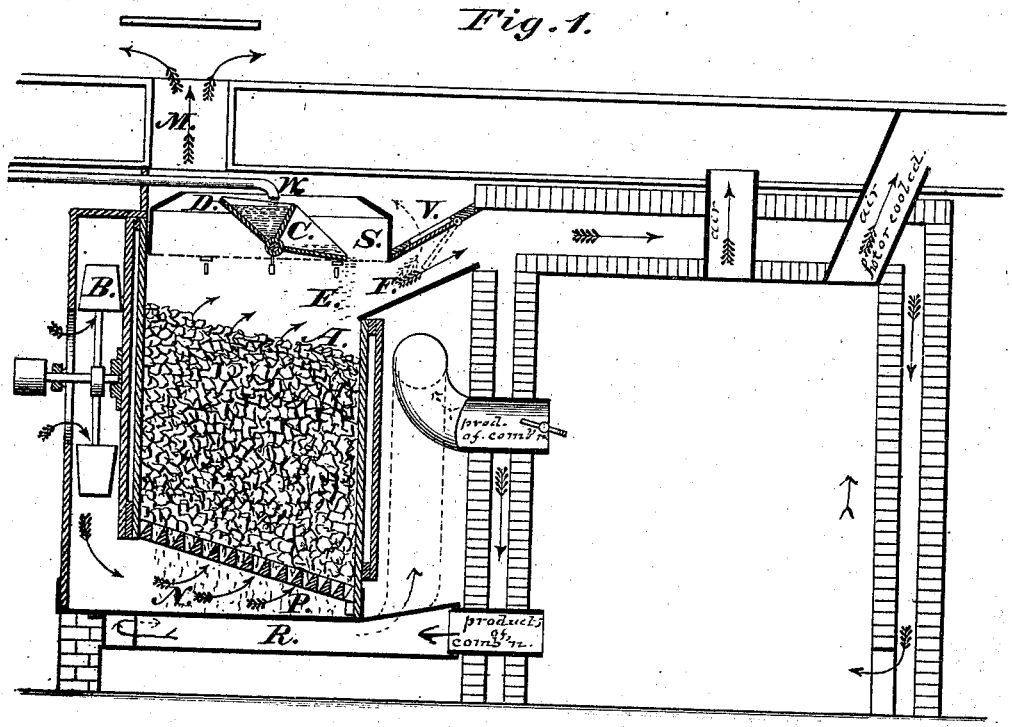

Figure 1 is a vertical section of an apparatus which I have in use for purifying, cooling, and drying or warming the air of my house.

A is a filter of charcoal, four feet long, four feet wide, and three feet deep. The charcoal is split into pieces, preferably half an inch to three-fourths of an inch thick and one or two inches long. This filter, composed of such pieces piled in loosely, presents an enormous surface to the air, while the pieces allow it to pass freely in zigzag directions up through them. Pulverized coal and small pieces are carefully excluded, as they would fill up the interstices between the lumps, and obstruct the free passage of the air. B is a fan to urge the circulation when it is used as a cooler, and placed below the room to be cooled. Cold well or spring water is sprinkled on the filter by means of the oscillating box C D, as needed. The water is supplied to this box by a small stream from the pipe W. When one side, C, is nearly full, it tips down and empties into its side S of the sprinkling-pan, and presents the other side, D, to be filled and emptied in its turn.

Any other arrangement that will disperse the water over the filter may be used. The filter may also be made of lumps of coke, or of pumice-stone, or even of pebble-stones, such as are found on the sea-shore, or of small earthen or glass cups properly constructed and arranged; but I greatly prefer the charcoal.

The charcoal, being porous, holds the water like sponge. This water gradually trickles down from top to bottom of the filter, while the air to be purified, cooled, and dried is flowing up through it in a contrary direction; and in direct contact with it. As the water and air are flowing in opposite directions the air, on leaving the top of the filter and entering the chamber E, will be cooled to near the temperature of the supply-water, while the discharged water, when falling from the charcoal into the pan P, will be warmed to near the temperature of the supply-air.

If, for example, the air enters the chamber N at a temperature of 100°, and the water falls upon the top of the filter at a temperature of 50°, and if the filter is of sufficient depth, and presents sufficient surface, the air will leave its top cooled below 53°, and dried so that its dew-point is below 53°, while the water, if sprinkled evenly and not in too great a quantity, will fall from the bottom of the filter into the pan P at a temperature above 90°. By this mode of contrary currents of water and air passing in opposite directions through each other it is evident that the greatest possible amount of cooling and drying can be done with the least possible amount of water.

If the same amount of air were cooled with the same amount of water, and dried to the utmost extent by the common mode of passing it through a shower of water in the form of fine spray, it would not be cooled as low as 82°, and the air of the room ventilated by it would be very warm and very damp, instead of being cool and very dry, as when this filter is used. As the air leaves this filter it passes, as indicated by the arrows, up the furnace-pipes and registers into the rooms in the different stories.

It is much easier distributing cool air than warm air, where it is wanted, through the lower stories of the dwelling. If sent up into the hall only, instead of rising directly to the upper stories, as hot air does, it spreads out into and cools and ventilates all the lower rooms, if their doors are left open, before rising to the upper stories, from whence it may be allowed to escape by the fire-places, and from the windows on the lee side of the house, or, if preferred, from an exhausting-cowl in the roof.

When this apparatus is to be used to cool a refrigerator for preserving meats or other perishable articles, or to cool air for other purposes where a very low temperature is required, I would supply it with salt-water cooled by the use of part of an ice-machine, the same water used over and over. By this mode we can cool the air to near zero, if desired.

For warming and ventilating in winter this air-purifying apparatus is also very useful, as has been proved by careful and thorough trial through several winters in my dwelling. For the first six or eight years there was no fan, and none is need, as the charcoal (about eight barrels) was split up so as to lie loosely, and generally changed yearly; the natural draft of the hot-air pipes was sufficient. But from some trials with the fan I have concluded that it might be made of great service in increasing the supply of air by any registers which have not sufficient natural draft. It can also be made to increase the draft of the fire in the furnace by having a small tube from the fan-chamber to the furnace chimney or pipe, ending in a jet aimed so as to force the gases rapidly up the flue. This arrangement prevents the possibility of the escape of any smoke or gas from the joints of the furnace into the house in any case while the fan is running, and insures a strong draft to the furnace while kindling the fire. From some trials I have concluded that, if preferred, instead of using two furnaces for a large building, the heating-power of a furnace may be doubled, and the ventilation by its flues increased to any desirable extent, by the application of a little power to the fan.

Figure 2:
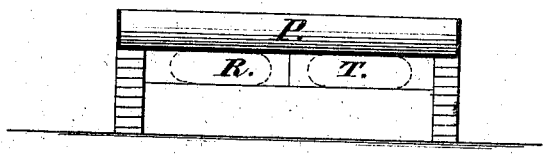

The smoke from the furnace formerly passed under the fan P, Figs. 1 and 2, by the flue R, and returned by the flue T, and from thence to the chimney, and no more water was sprinkled upon the charcoal than was evaporated from it and the pan P. From two to twenty gallons per day were evaporated, according to the condition of the air and the temperature of the water, and its vapor mingled with the air to be heated. The ordinary evaporating-pan in the furnace-chamber was dispensed with, thus saving the heat that would have been required to evaporate this water. Besides this, even when the temperature of the air was near zero before it entered from outdoors, it was generally warmed to the temperature of 50° or 60° by simply passing through the purifier, thus effecting a great saving in fuel. We have this last winter passed the products of combustion directly from the furnace to the chimney-flue without sending them under the pan, and depended entirely upon the cold water sprinkled upon the filter for moistening the air. This water is at all times below 50°, and when but little is sprinkled on, or during only a few minutes each day, the filter is, on very cold days, cooled below 35°, and notwithstanding the air is so very dry—the dew-point being below 35°—it is still very pleasant and agreeable, and I believe the change to be beneficial to the health—that it has something of the same effect as the very dry air of the western plains. It is more stimulating and invigorating, and the student accomplishes more mental labor in it, and with less effort than in moist air.

Where the winters are long and cold, or where large volumes of air are wanted for ventilation, I would moisten and warm all the air to near 50°, by the free use of well or spring water on the filter, thus not only purifying the air, and always moistening it just enough, but saving very greatly in fuel. In some cases more than one-half the fuel may be saved by this mode.

When the air is thus passed in thin zigzag streams through and in contact with this large wet charcoal filter, and thus thoroughly washed from its motes and impurities before coming in contact with the furnace, the heating of the furnace to redness causes none of that scorched smell so peculiar to furnaces and stoves when very highly heated. On the contrary it is considered more agreeable and salubrious than that from any hot-water apparatus.

In order that the principle and mode of operation of this apparatus may be clearly understood, I will briefly refer to a few facts.

The various zymotic diseases are believed to be caused by the inhalation of various decomposing matters which are floating in the air, and which, when inhaled, are mingled with the blood, and act like leaven in the fluids of the system. Consumption, also, and other forms of scrofulous disease, are the result of breathing impure air.

Pure cold water absorbs large amounts of impurities, and thus purifies foul air that is brought in contact with it. Charcoal also absorbs and destroys all decomposing matters and foul gases, and a filter of charcoal even stops particles of decomposing matter that are floating in the air while passing through it, apparently very much as a filter of magnets would the little particles of iron when floating in water through it.

It is believed that the two most deleterious gases in the air are sulphureted hydrogen and sulphuret of ammonia. Water absorbs several hundred times its volume of ammoniacal gas. It also absorbs its volume of sulphureted-hydrogen gas, while charcoal absorbs eighty times its volume of this most poisonous gas, and, uniting oxygen with it, forms dilute sulphuric acid, which is washed out of the charcoal by water passing down through it, and thus the charcoal is revivified by the water, and kept long in active operation.

In other respects this filter possesses great advantages over metallic pipes and radiators. If properly split up, five thousand square feet of cooling or warming surface of wet charcoal occupies less space than one hundred square feet of common cast-iron surface. The cost of this surface is comparatively trifling. The charcoal is also indestructible. It does not rust out like iron, nor poison the air with the smell of verdigris like copper. The air and water being here in direct contact, it is believed that the air is cooled and dried more perfectly than by iron or copper pipes containing water at the same temperature. But vastly more important than all the rest is the fact that the air is here thoroughly purified in passing up through the narrow zigzag passages of this charcoal filter, with its immense wet surfaces, and cleansed from all dust, motes, fungi, particles of decomposing matter, and impure gases from all miasms, whether contagious or malarious, and these poisons are carried off to the sewer by the waste-water, instead of being sent up into the house, as they are by the ordinary modes of ventilation, to be inhaled into the lungs and commingled with the blood, to poison and debilitate the system, and render it susceptible to diseases. With this apparatus in proper operation, the family, when at home, though in a filthy city, can at all seasons of the year enjoy a pure and healthful atmosphere.

I claim as my invention—

1. The combination, with the room to be purified, of the filter A, composed of pieces of charcoal, coke, or other similar pieces, the sprinkler D S, and air-chambers N and E, whereby the filter is suffused with sprayed water, and the air passed upward through the filter is purified and cooled or warmed, as desired, for the purposes specified.

2. The combination, with the room to be ventilated, of the filter A, composed of pieces of charcoal, coke, or other similar pieces, the sprinkler D S, and air-chambers N and E, with the fan or other arrangements for urging the circulation of the air up through the filter, for the specified purposes.

3. The combination of the filter A, composed of pieces of charcoal, coke, or other similar pieces, the sprinkler D S, and air-chambers N and E, with the air-chamber of a heating apparatus, substantially as and for the purposes specified.

AZEL S. LYMAN.

Witnesses:
E. L. GREENWOOD,
WM. W. OUTZ.